US008077681B2

(12) United States Patent
Ahmavaara et al.

(10) Patent No.: US 8,077,681 B2
(45) Date of Patent: Dec. 13, 2011

(54) METHOD AND SYSTEM FOR ESTABLISHING A CONNECTION VIA AN ACCESS NETWORK

(75) Inventors: Kalle Ahmavaara, Helsinki (FI); Seppo Vesterinen, Oulunsalo (FI)

(73) Assignee: Nokia Corporation, Espoo (FI)

( * ) Notice: Subject to any disclaimer, the term of this patent is extended or adjusted under 35 U.S.C. 154(b) by 1620 days.

(21) Appl. No.: 10/265,760

(22) Filed: Oct. 8, 2002

(65) Prior Publication Data

US 2004/0066769 A1    Apr. 8, 2004

(51) Int. Cl.
    *H04Q 7/24* (2006.01)
(52) U.S. Cl. ........................................ 370/338
(58) Field of Classification Search ................ 370/252,
       370/254, 465, 351, 352, 401, 328, 522, 392,
       370/393, 353
    See application file for complete search history.

(56) References Cited

U.S. PATENT DOCUMENTS

| 6,389,008 | B1 | 5/2002 | Lupien et al. | 370/352 |
|---|---|---|---|---|
| 6,452,915 | B1 * | 9/2002 | Jorgensen | 370/338 |
| 6,490,451 | B1 * | 12/2002 | Denman et al. | 455/436 |
| 6,608,832 | B2 * | 8/2003 | Forslow | 370/353 |
| 6,779,051 | B1 * | 8/2004 | Basil et al. | 710/33 |
| 6,781,999 | B2 * | 8/2004 | Eyuboglu et al. | 370/399 |
| 6,963,582 | B1 * | 11/2005 | Xu | 370/466 |
| 6,973,057 | B1 * | 12/2005 | Forslow | 370/328 |
| 7,079,499 | B1 * | 7/2006 | Akhtar et al. | 370/310 |
| 7,181,530 | B1 * | 2/2007 | Halasz et al. | 709/238 |
| 7,188,253 | B2 * | 3/2007 | Halasz et al. | 713/182 |
| 7,239,632 | B2 * | 7/2007 | Kalavade et al. | 370/389 |
| 7,239,864 | B2 * | 7/2007 | Zhang | 455/411 |
| 7,617,317 | B2 * | 11/2009 | Jones et al. | 709/227 |
| 2003/0171112 | A1 * | 9/2003 | Lupper et al. | 455/414.1 |
| 2008/0101291 | A1 * | 5/2008 | Jiang et al. | 370/331 |

FOREIGN PATENT DOCUMENTS

| EP | 0 912 027 A2 | 4/1999 |
|---|---|---|
| RU | 2107396 A2 | 3/1998 |
| RU | 2146850 C2 | 3/2000 |
| RU | 2187205 C2 | 8/2002 |
| WO | WO 01/76297 A1 | 10/2001 |
| WO | WO 02/19617 | 3/2002 |
| WO | WO 02/010390 A | 12/2002 |

OTHER PUBLICATIONS

Durand, A. et al., "IPv6 Tunnel Broker", Jan. 2001, Network Working Group, RFC 3053.*
Zorn, G. et al., "RADIUS Attributes for Tunnel Protocol Support", Jun. 2000, Networking Working Group, RFC 2868.*

(Continued)

*Primary Examiner* — Ayaz Sheikh
*Assistant Examiner* — Blanche Wong
(74) *Attorney, Agent, or Firm* — Harrington & Smith

(57) ABSTRACT

A method and system for establishing a connection via an access network (30) communicating with at least one user terminal, and at least one backbone network (100) comprising at least one user terminal authentication and authorization means (50) and at least one user data processing node (60, 62), wherein the connection of a user terminal (10) is authenticated to the access network (30) and one of the at least one user data processing nodes (60, 62) is selected based on selection information transferred in the authentication signaling. Then, a tunnel parameter information of the selected user data processing node is signaled to the access network (30) and a tunnel connection is created between the access network (30) and the selected user data processing node (60) based on the tunnel parameter information.

54 Claims, 5 Drawing Sheets

OTHER PUBLICATIONS

RFC 3261, "SIP: Session Initiation Protocol", Jun. 2002.*

Ala-Laurila, J. et al: "Wireless LAN Access Network Architecture for Mobile Operators" IEEE Communciations Magazaine, IEEE Service Center. Piscataway, N.J., US, vol. 39, No. 11, Nov. 2001, pp. 82-89, XP001107810 ISSN: 0163-6804.

Benenati, D. et al: "A Seamless Mobile VPN Data Solution for CDMA2000,* UMTS, and WLAN Users", Bell Labs Technology, Bell Laboratories, Murrey Hill, N.J., U.S., vol. 2, No. 7, 2002, pp. 143-165, XP001141709, ISSN: 1089-7089.

Salkintzis, A.K. et al: "WLAN-GPRS Integration for Next-Generation Mobile Data Networks", IEEE Wireless Communications, IEEE Service Center, Piscataway, N.J., U.S., vol. 9, No. 5, Oct. 2002, pp. 112-123, XP001132263, ISSN: 1070-9916.

$3^{rd}$ Generation Partnership Project; Technical Specification Group Services and System Aspects; WLAN Subsystem; System Description (Release 6). 3GPP TS 23.234 v1.0.0 (Sep. 2002). 3GPP support office address is 650 Route des Lucioles, Sophia Antipolis, Valbonne, France.

* cited by examiner

| Code | Identifier | Length |
|---|---|---|
| Type | Subtype | Reserved |
| AT_SRES | Length | Reserved |
| SRES | | |
| APN parameter | | |

METHOD AND SYSTEM FOR ESTABLISHING A CONNECTION VIA AN ACCESS NETWORK

FIELD OF THE INVENTION

The present invention relates to a method and system for establishing a connection via an access network, for example a Wireless Local Area Network (WLAN), communicating with at least one user terminal, and at least one backbone network, for example a General Packet Radio Service (GPRS) network or a Universal Mobile Telecommunications System (UMTS) network, comprising at least user terminal authentication and authorization means and at least one user data processing node.

BACKGROUND OF THE INVENTION

Over recent years, the market for wireless communications has enjoyed tremendous growth. Wireless technology now reaches or is capable of reaching virtually every location on the earth. With tremendous success of wireless telephony and messaging services, it is hardly surprising that wireless communication is beginning to be applied to the realm of personal and business computing. No longer bound by the harnesses of wired networks, people will be able to access and share information on a global scale nearly anywhere they venture.

The major motivation and benefit from evolving WLANs is increased mobility. Network users can move about almost without restriction and access LANs from nearly everywhere. In addition to increased mobility, WLANs offer increased flexibility. Meetings can be arranged, in which employees use small computers and wireless links to share and discuss future design plans and products. Such "ad hoc" networks can be brought up and torn down in a very short time as needed, either around the conference table and/or around the world. WLANs offer the connectivity and the convenience of wired LANs without the need for expensive wiring or re-wiring.

However, even with the fastest laptop, productivity while traveling can fall because of poor access to the Internet or company intranet. Despite the revolution of the Global System for Mobile communication (GSM), laptop users need faster access to download large files and to synchronize their e-mails quickly. The emerging mobile information society demands that data is available whenever and wherever. As a solution to this problem an operator WLAN (OWLAN) solution has been proposed which brings broadband access to the laptop or terminal device in specific places like airports, convention centers, hotels and meeting rooms. Thus, mobile network operators are able to offer broadband access to the internet, corporate intranets or other service machineries from virtually anywhere in the world. Thus, a public WLAN service with own WLAN roaming feature can be provided.

In packet-switched cellular networks, such as the GPRS or UMTS network, the users service descriptions are specified by Access Point Names (APN). GPRS is a common packet domain core network used for both GSM and UMTS networks. This common core network provides packet-switched services and is designed to support several quality of service levels in order to allow efficient transfer of non real-time traffic and real-time traffic. A Serving GPRS Support Node (SGSN) is provided to keep track of the individual location of a mobile terminal and performs security functions and access control. Additionally, a Gateway GPRS Support Node (GGSN) provides interworking with external packet-switched networks, and is connected with SGSNs via an IP-based packet domain backbone network. In the backbone network, the APN is in practice a reference to the GGSN to be used. In addition, the APN may, in the GGSN, identify the external network and optionally a service to be offered. Further details concerning the use and structure of APNs are defined e.g. in the 3GPP specification TS 23.003.

In GPRS a user can access home network services located behind access points identified by their APNs. When a user connects to a GPRS service, i.e. establishes a Packet Data Protocol (PDP) context as specified e.g. in the 3GPP specifications TS 23.060, the APN information selected by the terminal device or user equipment (UE) or the user of the terminal device is sent from the terminal device to the network in a PDP context establishment signaling. This information consists of APN and optionally username and password if required to access the service behind the selected APN. In the GPRS network, this information is used to select suitable GGSN. The information also arrives to the selected GGSN and the GGSN uses this information further to establish a connection to a network node behind the GGSN, e.g. a corporate intranet or an operator service node. If provided, the username and password are delivered to the concerned network node behind the GGSN to allow authorization of the connection.

However, in the proposed public or operator WLAN systems, an operation similar to the GPRS PDP context activation is not provided. In particular, there is no dedicated signaling for setting up services between a WLAN terminal device, i.e. WLAN UE, and the WLAN network or network behind the WLAN network. Such services can be e.g. access to the user's corporate intranet, third party ISP style services, mobile operator services, So far, users have only been able to connect to the Internet directly via the local WLAN access network. Therefore, GPRS type of service selection and activation is not possible via the WLAN network, which thus forms a drawback in the proposed public or operator WLANs.

SUMMARY OF THE INVENTION

It is therefore an object of the present invention to provide a method and system for enabling access from a WLAN network or any other access network to a broader range of services.

This object is achieved by a method of establishing a connection via an access network communicating with at least one user terminal, and at least one backbone network comprising at least user terminal authentication and authorization means and at least one user data processing node, said method comprising the steps of:
  authenticating the connection of a user terminal to said access network;
  selecting one of said at least one user data processing nodes based on a selection information transferred in said authentication step;
  signaling a tunnel parameter information of said selected user data processing node to said access network; and
  creating a tunnel connection between said access network and said selected user data processing node based on said tunnel parameter information.

Furthermore, the above object is achieved by an authentication server device for-providing an authentication mechanism, said authentication server device being arranged:
  to select a user data processing node based on a selection information received in an authentication signaling from a terminal device connected to an access network;
  to obtain from a signaling with said user data processing node a tunnel parameter information; and
  to signal said tunnel parameter information to an access server device of said access network.

Additionally, the above object is achieved by access controlling device for controlling access to an access network to which a terminal device is connected, said access controlling device being arranged to obtain a tunnel parameter information from a signaling message received from an authentication server device and to create a tunnel connection to a user data processing node so as to provide a service access for said terminal device.

Accordingly, a selection information is forwarded from the access network to the backbone network by using an authentication signaling. The selection information can then be used at the backbone network to select a user data processing node in order to create a tunnel connection. Thereby, access to network services of third parties is possible over the access network, e.g. the WLAN. Based on a signaling of a third element with both endpoints of the tunnel, a tunnel connection can be created between two network elements originally unknown to each other. Thus, dynamic service selection and multiple simultaneous connections to different services are enabled, and service continuity is obtained between different networks, such as WLANs and cellular packet-switched networks. Thereby, network flexibility and user mobility can be enhanced and service logics can be unified in different networks.

A key advantage is that standard building blocks, as they are used in access networks like WLANs are combined in a specific way to achieve desired system level functionality. This makes it easy for network providers, e.g. WLAN providers, to adopt this solution. Moreover, the impact to the user terminals is minimized, which also maximizes interoperability. Another operator benefit is the involved saving of subscriber related operator expenditure due to a possible reuse of cellular provisioning systems for WLAN solutions. The proposed solution is advantageous in that current service description mechanisms, such as the APN mechanism in GPRS, can be used in new operator WLANs to thereby support legacy solutions.

At least one signaled tunnel parameter may be used as an identifier within said created tunnel connection. This at least one tunnel parameter may be a tunnel assignment ID. Furthermore, the created tunnel connection may be of a GRE type. Then, the at least one tunnel parameter may be used as the Key parameter of the created GRE tunnel.

The authentication signaling may be a signaling according to the Extensible Authentication Protocol (EAP). In particular, the authentication signaling may comprise an EAP response message. The service selection information may comprise at least one APN parameter. This at least one APN parameter may comprise an APN, a username and a password of the desired service. Furthermore, the APN parameter may be encrypted in the authentication message. The applied encryption for different APN parameters may be selected differently, so that selected APN parameters may be forwarded by the authentication server to the selected access point in encrypted format, and that the selected APN parameters are decrypted only at the access point or selected service network.

The tunnel parameter information may be signaled to the access network in an AAA Access Accept message. The AAA protocol may be RADIUS or Diameter. The tunnel parameter information may comprise at least one of a tunnel type, a tunnel medium, a tunnel server address and a tunnel assignment identification.

Furthermore, the user data processing node may be a WLAN gateway or a GGSN.

The selection information may be resolved to an AAA realm name in the selection step. In particular, the selection information may be a service selection information.

At the selected user data processing node at least one of an external server realm name, tunnel parameters and filtering parameters may be stored. Based on the selection information it may then be checked whether to signal the selection information to the external server.

The authentication server may be arranged to signal the tunnel parameter information in an AAA Access Accept message. This tunnel parameter information may comprise at least one of a tunnel type, a tunnel medium, a tunnel server address and a tunnel assignment identification. For example, the tunnel type may be GRE, and/or the tunnel medium may be IPv4 or IPv6. The authentication server may be arranged to incorporate an EAP Success message into said AAA Access Accept message. This EAP Success message can then be signaled by the authentication signaling to the terminal device requesting e.g. the service connection.

The access controlling device may be adapted to use the tunnel assignment identification as a flow identification of the created tunnel connection. As an example, this flow identification may then be signaled in a Key GER attribute.

Further advantageous modifications are defined in the dependent claims.

BRIEF DESCRIPTION OF THE DRAWINGS

In the following, the invention will be described in greater detail based on a preferred embodiment with reference to the accompanying drawings, in which.

DESCRIPTION OF THE PREFERRED EMBODIMENT

Figure 1:
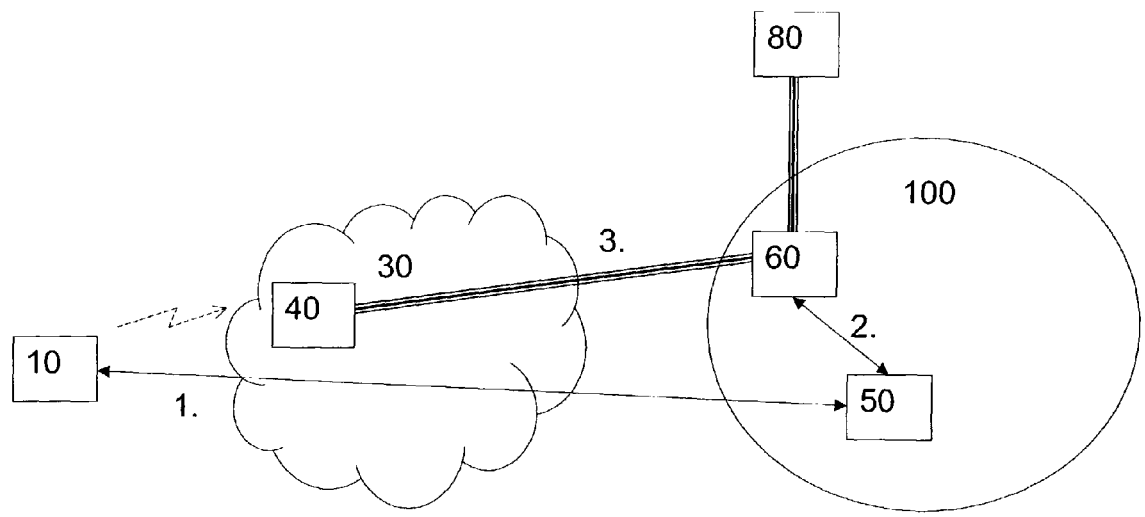
FIG. 1 shows a schematic block diagram indicating the basic principles underlying the present invention.
Figure 2:
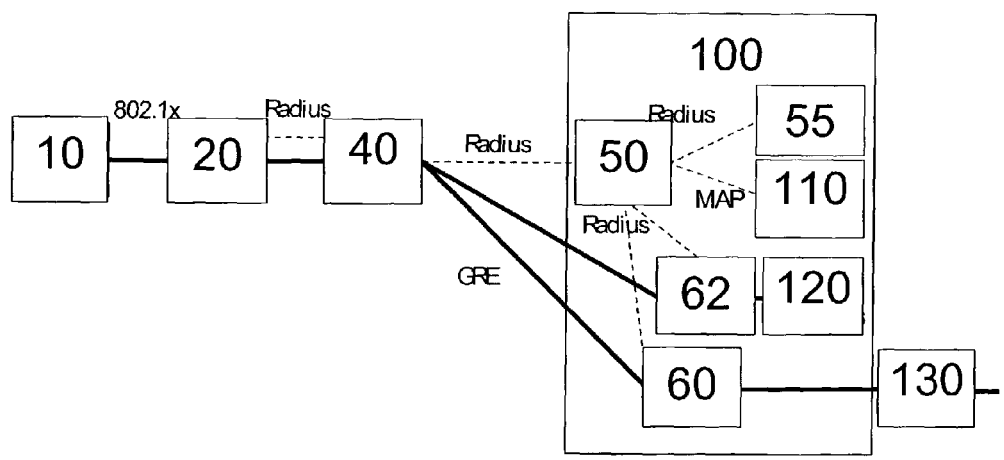
FIG. 2 shows a schematic block diagram of a network architecture according to the preferred embodiment, where a WLAN is connected via a WLAN gateway to a GPRS network.

The preferred embodiment will now be described on the basis of a network architecture as indicated in FIGS. 1 and 2, where a WLAN user is authenticated to access a WLAN network by an EAP authentication to thereby get access to a cellular packet-switched service.

FIG. 1 shows a schematic block diagram of a network architecture comprising a WLAN 30 and a home network 100, e.g. a GPRS network or any other cellular packet switched network. A terminal device or WLAN UE 10 which is subscribed to a home network service and wishes to get access to the service, first transfers a service selection information indicating at least one APN parameter and an optional username and password via the WLAN 30 to an authentication server 50 of the home network 100 by using an authentication signaling, e.g. an authorisation request message ($1^{st}$ step). Then, the authentication server 50 selects a WLAN gateway 60 arranged in the home network 100, signals the service information to the WLAN gateway 60, and as a response receives from the WLAN gateway 60 a connection information for establishing a connection between an access server 40 of the WLAN 30 and an application server 80 providing the requested service and being identified by the at least one APN parameter ($2^{nd}$ step). In particular, the authorisation request may be forwarded further to the application server 80 or another external AAA server together with the username and password and the WLAN gateway 60 first receives a response from there and then proxies this response to the access server 40.

FIG. 2 shows a more detailed block diagram of an OWLAN user plane architecture in which the preferred embodiment of the present invention can be implemented.

In FIG. 2, a WLAN UE 10 is connected via a wireless connection, e.g. based on a IEEE 802.1×WLAN protocol, to an access point 20 of the WLAN. It is noted that the access point 20 has some similar basic functionalities as a base station in a general cellular network, such as providing the connection over the air interface towards the mobile UE. The access point 20 is not mobile and forms part of the wired network infrastructure. Further details regarding the architecture and function of the WLAN network can be gathered e.g. from the IEEE specification 802.11.

Furthermore, the WLAN comprises a WLAN access server 40 for establishing a connection to external networks such as the home network 100 or another packet-switched network, e.g. the Internet or an operator or company intranet. The home network 100 may be a GPRS network or a WLAN backbone network and comprises an authentication server 50, with an allocated authentication server database 55 in which subscriber information such as service profile information of each connected terminal device or UE are stored after retrieval of that information from a permanent subscriber database 110, e.g. Home Location Register (HLR) or Home Subscriber Server (HSS), which can be accessed by a MAP (Media Access Protocol) signaling. It is noted that the functionality of the authentication server 50 can also be located at another network, e.g. a WLAN backbone or subsystem. The authentication signaling with the UE 10 may be based on the EAP SIM authentication protocol in case a GSM SIM card is used within the UE 10. Alternatively, the authentication may be based on the EAP AKA (Authentication and Key Agreement) authentication protocol in case a UMTS SIM card is used within the UE 10.

The EAP protocol mechanism is used for authentication and session key distribution by means of the GSM SIM or the USIM. Authentication is based on a challenge-response mechanism, wherein the authentication algorithm which runs on the SIM or USIM card can be given a random number (RAND) as a challenge. The SIM or USIM runs an operator-specific confidential algorithm which takes the RAND and a secret key stored on the SIM or USIM as input, and produces a response (SRES) and a key as output. The key is originally intended to be used as an encryption key over the air interface.

The authentication server 50 has an interface to the GSM or UMTS home network 100 of the UE 10 and operates as a gateway between the packet-switched AAA (Authentication, Authorization and Accounting) networks and the GSM or UMTS authentication infrastructure. After receiving an EAP identity response including user identification mappable to the user's International Mobile Subscriber Identity (IMSI) the authorization server 50 obtains n triplets or quintuplets from the authentication center at the home location register (HLR) or Home Subscriber Server (HSS) 110 of the user's home network 100. From the triplets, the authentication server 50 derives the keying material based on a cryptographic algorithm.

According to the preferred embodiment, the WLAN authentication signaling is used for signaling GPRS service subscription or selection information via the authentication server 50 to the home network 100. The GPRS service information or service selection information comprises the APN of the desired service and an optional username and password required to connect to the service via the indicated APN. The authentication server 50 uses the obtained service selection information to select the WLAN gateway 60 having a similar function to a GGSN, from where the user can get access to the subscribed service. The subscribed service can be e.g. an access to a corporate intranet or to services of a mobile operator.

The OWLAN user plane handling enables controlled and forced access to services provided by the home network 100 via the WLAN. This is a new feature in addition to the direct internet access service provided already. The services provided by the home network 100 can be either home operators own services or third party services like corporate intranet access. The provided service can be the same as those offered via GPRS Access points.

These home network services are accessible via the OWLAN home network 100, via the WLAN gateway 60 identified by its Access Point Names (APN). The information about home network services for a specific user are configured in a database 55, hereinafter called authentication server database, accessible for the authentication server 50 and all other home network authentication servers. The information in the authentication server database 55 is a subset of the information in HLR GPRS profile. The authentication server database 55 may be created by copying from the HLR 110 either by a MAP Update Location procedure or via an O&M (Operation & Maintenance) functionality.

When the home authentication server 50 is authenticating the user it checks from the authentication server database 55 whether the user is subscribed to home network services. If not then the authentication server 50 proceeds EAP authentication normally.

If the user is subscribed to home network services, the authentication server 50 waits for APN information from the WLAN UE 10. The WLAN UE 10 may inform a desired APN in the EAP-SIM Response message. APN information consists of APN, and optionally username and password for the APN. If the user doesn't include any APN information in the EAP-SIM Response message, the authentication server 50 proceeds EAP authentication normally and plain Internet access is assumed. When the user indicates by the APN parameters that he is connecting to a specific APN the authentication server 50 checks from the retrieved subscription information the user's authorisation to access the indicated APN. After successful check the authentication server 50 resolves the APN name to a WLAN gateway AAA Server realm name, e.g. a RADIUS (Remote Authentication Dial In User Service) realm name, and requests permission for the user identified by his IMSI (International Mobile Subscriber Identity) to access the WLAN gateway 60. Further details regarding the RADIUS protocol which is used for carrying authentication, authorization and configuration information between a network access server and a shared authentication server can be gathered from the IETF (Internet Engineering Task Force) specification RFC 2138.

The authentication server 50 requests the WLAN gateway 60 (or network behind the WLAN gateway 60) to allocate suitable tunneling parameters and to authorise the user to access the APN. This is done by sending an AAA Access request, e.g. a RADIUS Access request, to the indicated WLAN gateway RADIUS server. Depending on the utilised AAA realm name, the WLAN gateway 60 detects the requested service.

If the service is a mobile operator (MO) service provided by a home network server 120, a respective WLAN gateway 62 selects appropriate tunneling and filtering parameters from an internal database for the service, assigns a tunnel assignment ID and sends an AAA Access Accept message back to the authentication server 50.

If the service is a third party service, the WLAN gateway 60 selects a respective external AAA server, e.g. a RADIUS server 130, based on the utilized AAA realm name and forwards the AAA Access request, e.g. with username and password, there. After reception of the AAA Access Accept message and establishment of the indicated tunnel to the external network, the WLAN gateway 60 selects tunneling parameters towards the WLAN access server 40, assigns a tunnel assignment ID and sends a RADIUS Access Accept message to the authentication server 50. The authentication server 50 adds the EAP Success message and the keying material to the AAA Access Accept message and forwards it to the WLAN access server 40.

If the WLAN UE 10 supports IP multihoming and thus simultaneous connections with different IP addresses it is possible to establish multiple connections in parallel to already existing ones in the same way as described here. Each connection would have its own WLAN UE IP address, its own WLAN gateway and its own tunnel between the respective WLAN gateway and the WLAN access server 40. An accounting function may then be used to detect the existence of a user plane tunnel.

Figures 3, 4:
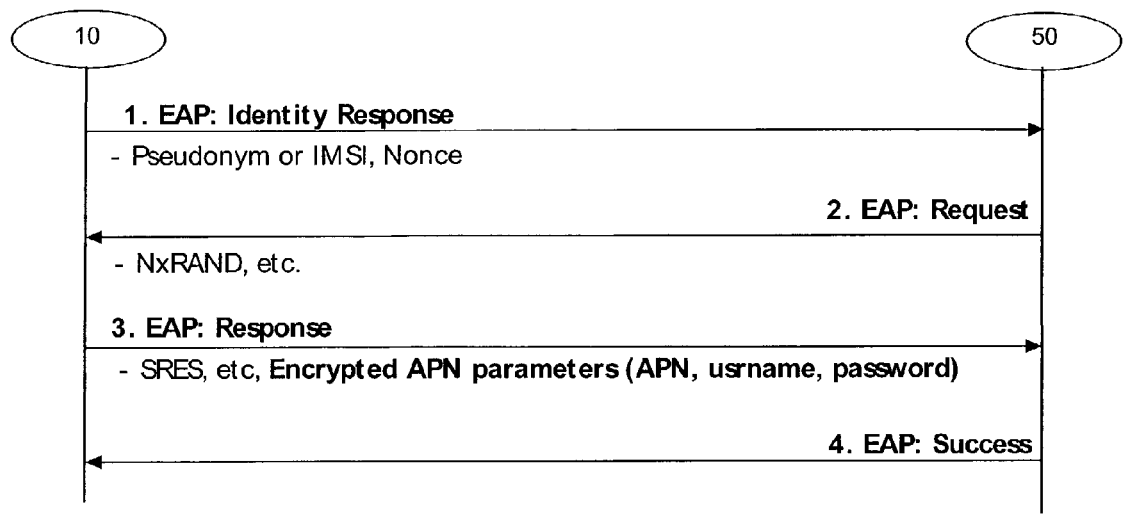
FIG. 3 shows a signaling diagram indicating an EAP signaling according the preferred embodiment of the present invention.
FIG. 4 shows the format of an enhanced EAP Response Challenge packet according to the preferred embodiment.

FIG. 3 shows a signaling diagram indicating an EAP-SIM authentication signaling between the UE 10 and the authentication server 50. The first EAP request (not shown) issued by the network is an EAP Identity Request. The client or UE 10 responds with an EAP Identity Response (step 1) comprising a pseudonym or IMSI. The pseudonym is used when an identity privacy support is being used by the UE 10. In response to the EAP Identity Response message or packet, the authentication server 50 sends an EAP challenge request comprising the n random numbers RAND among other parameters (step 2). In response thereto, the UE 10 issues an EAP Challenge Response including the calculated response value SRES. Furthermore, according to the preferred embodiment of the present invention, the EAP Challenge Response also includes at least one encrypted APN parameter specifying the desired GPRS service to be accessed. The encrypted APN parameters my comprise the APN of the desired service and an optional username and password for getting access to the service (step 3). The applied encryption for different APN parameters may be selected differently. I.e., the APN itself may be the only APN parameter which is required for AP selection, and therefore only this parameter has to be in a format which is to be decrypted and/or read by the access server. The username and password parameters may be forwarded by the authentication server to the selected access point in encrypted format, and these parameters are decrypted only at the access point or selected service network. It is thus not possible to access them while transferred via the first network. If the authentication procedure was successful, the authentication server 50 responds with an EAP Success message (step 4).

The above authentication signaling procedure enables a signaling of service selection parameters to the authentication server 50 without requiring any additional context activation function as would be required in a conventional GPRS network without WLAN functionality. To achieve this enhanced functionality of the authentication signaling, the client software at the UE 10 is modified or programmed to add the respective service selection information to the EAP Challenge Response message. In particular, if a user has selected to connect to a specific service identified by its APN, the service information or service selection information is configured in the client software at the UE 10. For each service the following settings may be performed. Firstly, a free text entry identifying the service for the user may be set. Secondly, the APN, i.e. the identification of the Public Land Mobile Network (PLMN) plus the Domain Name Server (DNS) name assigned by the Mobile Operator (MO) may be set to point to the specific service, and, thirdly, a setting indicating whether the username and password are required (e.g. a Yes/No setting) can be made in the client software. The third setting may comprise a setting indicating either a predefined or a dynamic username or/and password setting.

At the latest after reception of the EAP request message, the UE 10 gets the required service selection related information from the user and encrypts it as specified by the utilized signaling protocol such as EAP-SIM. The UE 10 then inserts the APN parameter information to the EAP Challenge Response message and sends it to the authentication server 50.

FIG. 4 shows a format of the enhanced EAP SIM Challenge Response message according to the preferred embodiment as generated at the SIM. A "code" field is used to identify the message as a response message. An "identifier" field is one octet and aids in matching replies to responses. In particular, the "identifier" field must match the "identifier" field of the message to which it is sent in response. The "length" field indicates the length of the EAP message or packet. The "type" and "sub-type" fields are set to specific values specifying the EAP SIM Challenge Response message. The "reserved" fields are set to zero upon sending and ignored on reception. The "AT_SRES" field indicates an attribute value and is followed by an additional "length" field indicating the length of the following SRES value and by a "reserved" field. Finally, the proposed APN parameters specifying the requested service may be added e.g. as encrypted values.

Figure 5:
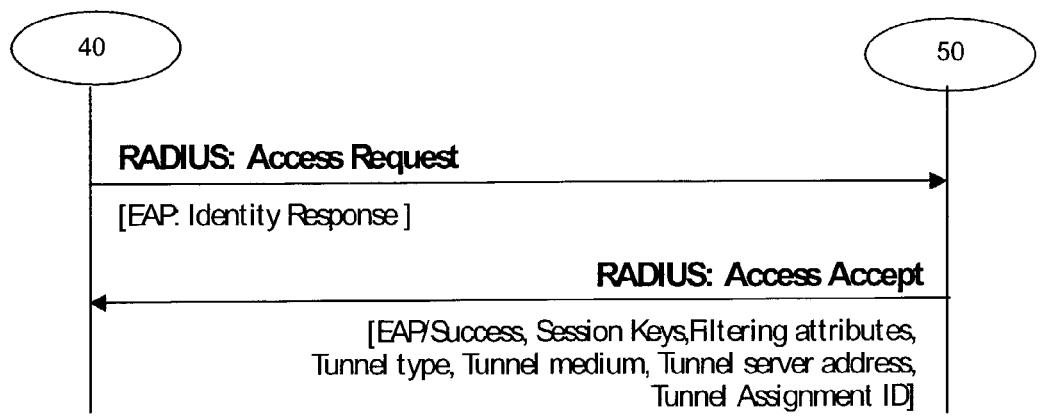
FIG. 5 shows a signaling diagram indicating a RADIUS authentication signaling according the preferred embodiment of the present invention.

FIG. 5 shows a signaling diagram indicating a RADIUS authentication signaling according the preferred embodiment of the present invention. When the WLAN access server 50 receives a RADIUS Access Accept message it examines the parameters related to tunneling settings. If the Tunnel Type Attribute defined in the IETF specification RFC 2868 is present, tunneling shall be applied for the user. In particular, the Tunnel-Type Attribute 9 (GRE) can be utilised by the WLAN access server 40, while an IP (Internet Protocol) address can be added as one optional field. Then, the WLAN access server 40 may act either as Boot Protocol relay, if the IP address is not delivered in the RADIUS signaling, or as a DHCP (Dynamic Host Configuration Protocol) server allocating IP addresses given by the RADIUS signaling.

The tunnel medium type can be indicated by the Tunnel-Medium-Type attribute defined in RFC 2868. The supported medium types are IPv4 (IP version 4) and IPv6 (IP version 6).

The tunnel is then established towards the indicated Tunnel server end point address. This information is given in the Tunnel-Server-Endpoint Attribute, defined in RFC 2868, in the RADIUS Access Accept.

The end point address can be either a FQDN or an IP address with dotted notation. Depending on the Tunneling base protocol (IPv4 or IPv6) the end point address is also of format IPv4 or IPv6.

The RADIUS Tunnel-Assignment-ID can be used by the WLAN access server 40 as a flow ID of the GRE tunnel to be established towards the indicated tunnel server endpoint address. In GRE, the flow ID is provided by the Key GRE attribute.

After GRE tunnel establishment, the WLAN access server 40 maps all user data received from the WLAN UE 10 to the tunnel towards the tunnel server. This includes any DHCP requests.

In case no tunneling parameters are set in the RADIUS Access Accept message, the WLAN access server 40 may utilize an internal DHCP server for IP address allocation and route the forthcoming user data directly to the Internet according to a local routing policy.

In the following, the service subscription retrieval signaling between the authentication server 50 and the authentication server database 55 is described.

Figure 6:
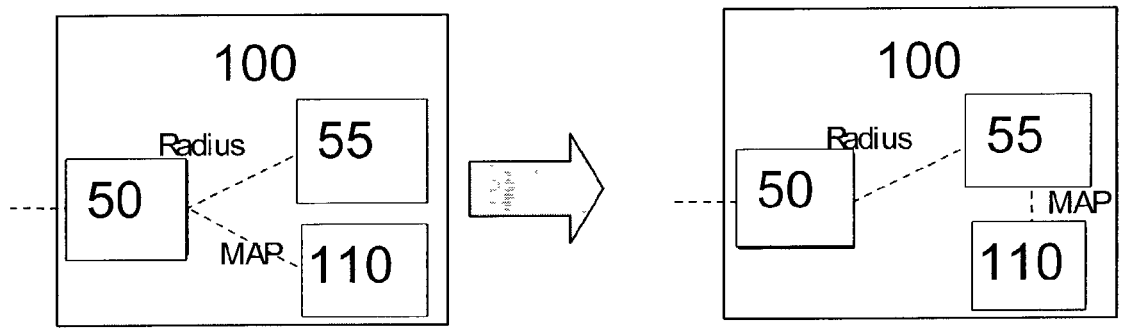
FIG. 6 shows interface architectures between an authentication server and an authentication server database according the preferred embodiment of the present invention.

FIG. 6 shows interface architectures between the authentication server 50 and the authentication server database 55. The interface between the authentication server 50 and the authentication database 55 may support a many-to-one connection, i.e. multiple authentication servers may be able to use the same authentication server database. Specifically, the authentication server database functionality may correspond to the forthcoming WLAN specific functionality of the HSS as defined in the corresponding 3GPP release 6 specification. The interface between the authentication server 50 and the authentication server database 55 may thus resemble the forthcoming Wx interface being specified by 3GPP. The Wx application may be used on top of the RADIUS connection between authentication servers and the authentication server database 55. Also the MAP interface towards the HLR 110 could logically be between the authentication database 55 and the HLR 110.

Figure 7:
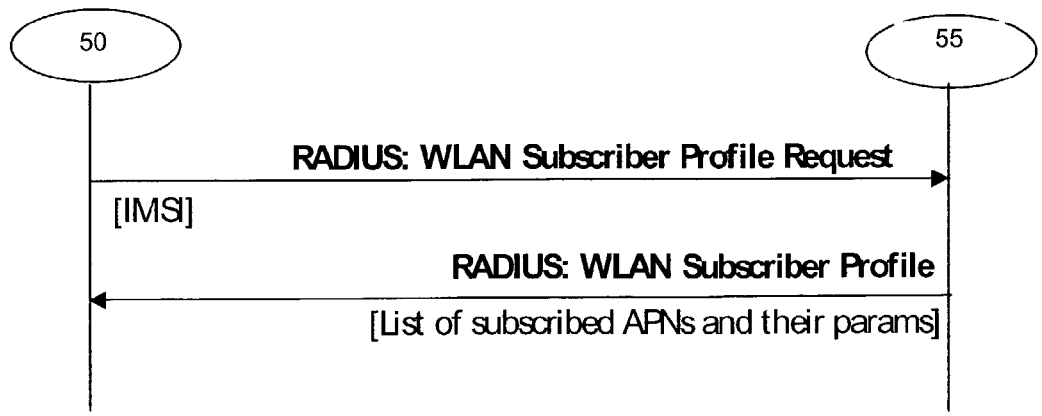
FIG. 7 shows a signaling diagram indicating a database query signaling according the preferred embodiment of the present invention.

FIG. 7 shows a signaling diagram indicating a signaling for a query at the authentication server database query 55. At latest when the user provides APN information within the EAP-SIM Response message, the authentication server 50 queries the authentication server database 55 for the subscriber's service subscription information. The subscription Information may be requested by the RADIUS application message WLAN Subscriber Profile Request. This message contains the IMSI of the subscriber. The authentication server database 55 responds with the RADIUS application message WLAN Subscriber Profile. This message contains a list of subscribed services for the indicated subscriber. For each subscribed service following information is included:

Access Point Name (APN)
MSISDN number (for MCD)
SIM authentication, or extra username and password authentication If no subscribed services exist, the authentication server database 55 may return an empty message.

In the following, the tunnel parameter transfer from the external RADIUS server 130 via the WLAN gateway 60 to the authentication server 50 is described.

Figure 8:
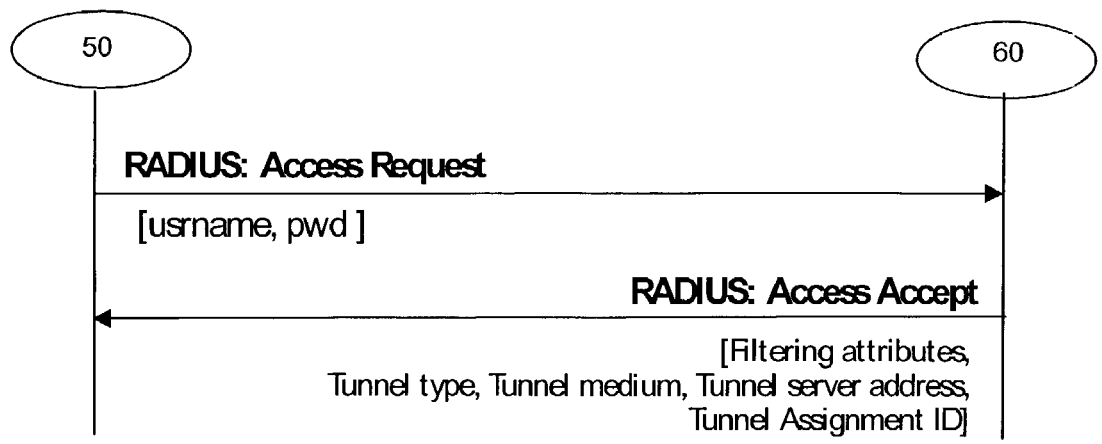
FIG. 8 shows a signaling diagram indicating a RADIUS signaling for tunnel parameter transfer between the WLAN gateway and the authentication server according the preferred embodiment of the present invention.
Figure 9:
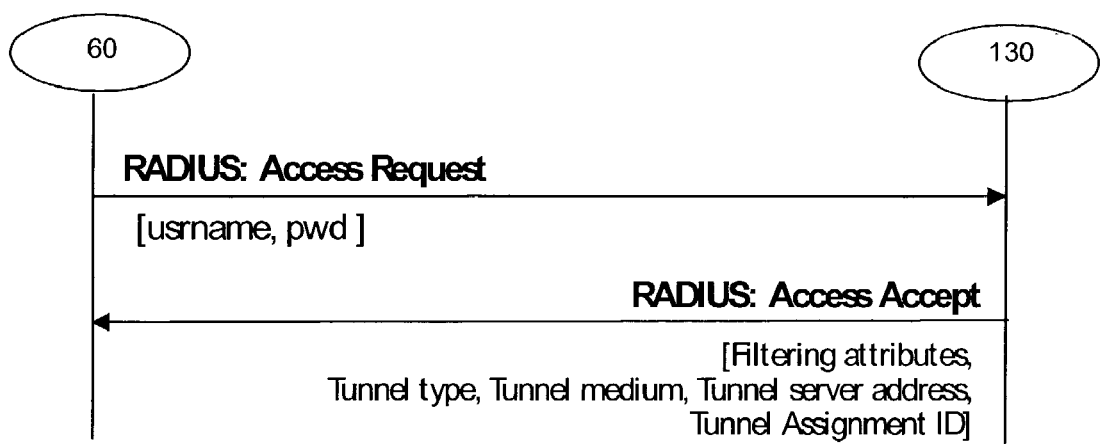
FIG. 9 shows a signaling diagram indicating a RADIUS signaling for tunnel parameter transfer between an external server and the WLAN gateway according the preferred embodiment of the present invention.

FIG. 8 shows a signaling diagram indicating a RADIUS signaling for tunnel parameter transfer between the WLAN gateway 60 and the authentication server 50, and FIG. 9 shows a signaling diagram indicating a RADIUS signaling for tunnel parameter transfer between the external RADIUS server 130 and the WLAN gateway 60. There is one to one mapping between an APN and the RADIUS Server 130 authorising the user's access to the service. Typically, the RADIUS server 130 or RADIUS proxy towards the server locates within a WLAN gateway. The authentication server 50 resolves the RADIUS Server name associated with the indicated APN from an internal database, i.e. not from the authentication server database 55 which contains only subscriber specific entries.

In particular, the authentication server 50 sends a RADIUS Access Request message towards the resolved RADIUS server 130.

If the service relies on SIM authentication, the authentication server 50 may use the authenticated IMSI as user's identity in the RADIUS Access Request message.

If the service has its own additional authentication, the authentication server 50 may use the username and password provided within the APN parameters in the EAP SIM Response within the RADIUS Access Request message.

Upon reception of RADIUS Access Request, the WLAN gateway 60 checks from its internal database the service associated to the utilized realm name. There shall be one to one mapping between each realm name and service available via the WLAN gateway 60.

For each service, the following information can be stored in WLAN gateway 60:

External RADIUS server realm name (if any)
Appropriate tunneling parameters
Appropriate filtering parameters The WLAN gateway 60 checks whether the RADIUS Access Request message is to be proxied to the external RADIUS server 130 or not. If yes, the WLAN gateway 60 forwards the message to the external RADIUS server 130 using the realm name resolved from its internal database.

In unsuccessful cases, the authentication server 50 receives a RADIUS Access Reject message as a reply and the authentication server 50 rejects the connection from the WLAN UE 10 with an appropriate reason code.

In successful cases, the authentication server 50 receives a RADIUS Access Accept message from the RADIUS server 130. This message includes appropriate tunneling and filtering attributes to be utilized between external network and the WLAN gateway 60.

The tunneling parameters may include:

Tunneling type (GRE)
Tunneling medium (IPv4 or IPv6)
Tunnel Server Address (Address allocated by WLAN gateway 60)
Framed IP Address attribute (optional)
Tunnel Assignment ID (unique identifier allocated by WLAN gateway 60)

Also, pre-configured L2TP (Layer 2 Tunnel Protocol) tunnels can be supported between the WLAN gateway 60 and external networks can be supported.

Then, the WLAN gateway 60 forwards the RADIUS Access Accept message to the authentication server 50. The authentication server 50 adds the EAP Success message and session keying material to the RADIUS Access Accept message and forwards it to the WLAN access server 40.

Figure 10:
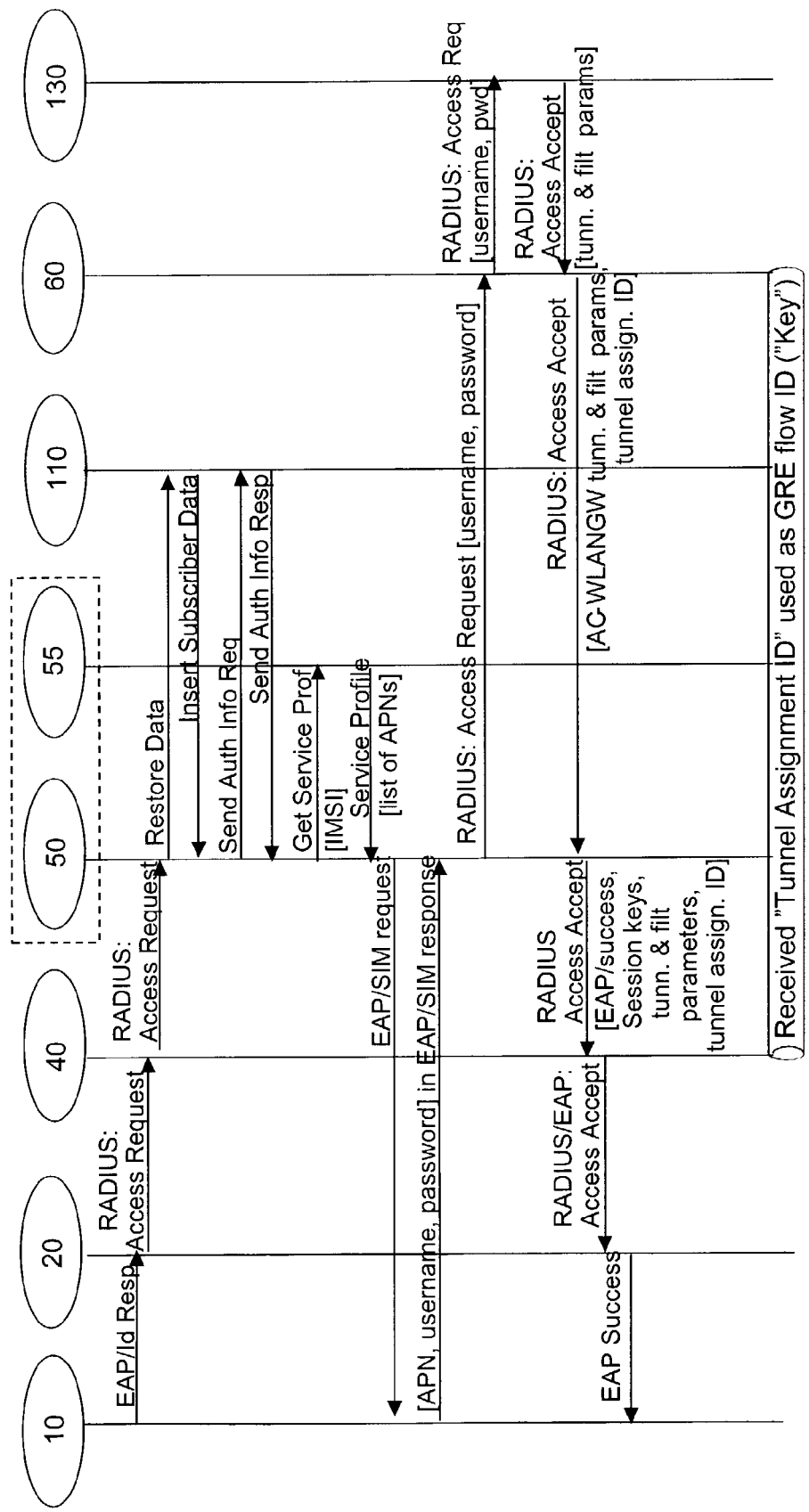
FIG. 10 shows a signaling diagram indicating a connection setup signaling for providing access to a service, according to the preferred embodiment.

FIG. 10 shows a detailed signaling diagram indicating a service access to a GPRS service via the WLAN 30. Initially, the EAP Identity Response is transmitted from the UE 10 to the access point 20 which generates a RADIUS Access Request message and forwards this message via the WLAN access server 40 to the authentication server 50. The authentication server 50 performs a processing for restoring subscriber data at the HLR 110 of the home network 100 of the WLAN UE 10 and the HLR 110 responds with the subscriber data of the WLAN UE 10. Then, the authentication server 50 issues a Send Authorization Info Request message to the HRL 110 which responds with a Send Authorization Info Response message which includes the required authorization information. Then, the authorization server 50 requests a service profile information from the authorization database 55 by using the IMSI of the subscriber of the UE 10 and receives from the database 55 a service profile including a list of APNs indicating the subscribed services of the subscriber. Then, the authentication server 50 issues an EAP Challenge Request message, e.g. EAP SIM Request, to the UE 10 and receives the enhanced EAP Challenge Response message, e.g. EAP SIM Response, specified in FIG. 4.

Based on the APN parameter information and the optional username and password, the authentication server 50 selects the WLAN gateway 60 and forwards a RADIUS Access Request message including username and password to the WLAN gateway 60 which routes the RADIUS Access Request to the concerned APN, e.g. the external RADIUS server 130. The RADIUS server 130 responds with a RADIUS Access Accept message comprising tunnel and filter parameters required for establishing a tunnel connection in order to provide the requested service. The WLAN gateway 60 generates tunnel and filter parameters, required for the tunnel connection between an access controller functionality of the WLAN access server 40 and the WLAN gateway 60, and a tunnel assignment ID and forwards the RADIUS Access Accept message to the authentication server 50. The authentication server 50 adds to the RADIUS Access Accept message an EAP Success message and session keys, and forwards the RADIUS Access Accept message to the WLAN access server 40. In response thereto, the WLAN access server 40 forwards a RADIUS Access Accept message comprising the EAP Success message to the WLAN access point 20 which extracts the EAP Success message and forwards it to the WLAN UE 10. Finally, based on the information received from the authentication server 50 in the RADIUS Access Accept message, the WLAN access server 40 establishes a tunnel connection to the WLAN gateway 60 using the tunnel assignment ID as a flow ID or key.

In summary, the service access is achieved by incorporating or including a packet-switched domain type service selection information as a new encrypted attribute in the EAP SIM or EAP AKA authentication signaling. When a user desires to connect to a specific service identified by an APN, user or client software in the WLAN UE 10 sets the desired APN and optional username and password to the concerned EAP message, and the WLAN 30 uses this information for selecting a suitable user plane network element as well as tunneling and filtering policies.

It is noted that the present invention is not restricted to the described WLAN and GPRS service and can be used in any network architecture where a control plane signaling required for accessing a packet-switched service is not provided in the access network. The functionalities of the authentication server 50 and the gateway 60 not necessarily have to be GPRS functionalities, but can be located in any backbone network or subsystem of the WLAN or any other network accessible by the WLAN 30. They may be provided in standalone server devices or in GPRS GGSN or SGSN functionalities, respectively. Also, the accessed service does not have to be a GPRS service. Thus, the WLAN UE 10 can be a single-mode WLAN terminal without GPRS functionality but with a functionality to access external services via an authentication signaling, e.g. by a similar mechanism as the GPRS service selection mechanism. Furthermore, any given authentication message can be used for transferring the service selection information. The preferred embodiments may thus vary within the scope of the attached claims.

The invention claimed is:

1. A method comprising:
authenticating, at an authentication server in a backbone network, a request for access to the backbone network that provides context-based services via a wireless access network between at least one user terminal and at least one backbone network, wherein the backbone network comprises the authentication server and at least one user data processing node;
selecting, at the authentication server, one of said at least one user data processing node; and
signaling, by the authentication server, tunnel parameter information of said selected user data processing node, said tunnel parameter information provided by said selected user data processing node, to said wireless access network for creating a tunnel connection between said wireless access network and said selected user data processing node based on said tunnel parameter information.

2. A method according to claim 1, further comprising using at least one signaled tunnel parameter as an identifier within said created tunnel connection.

3. A method according to claim 2, wherein said at least one tunnel parameter is a tunnel assignment identification.

4. A method according to claim 2, wherein said created tunnel connection is of a generic routing encapsulation type.

5. A method according to claim 4, further comprising using said at least one signaled tunnel parameter as the key parameter of the created generic routing encapsulation tunnel.

6. A method according to claim 5, wherein said wireless access network is a wireless local area network.

7. A method according to claim 6, wherein said backbone network is a cellular packet-switched network.

8. A method according to claim 7, wherein said cellular packet-switched network is a generic packet radio service network.

9. A method according to claim 8, wherein said authentication is based on an extensible authentication protocol signaling.

10. A method according to claim 9, wherein selection information is used in selecting the one of the at least one user data processing node, and wherein said selection information comprises at least one access point node parameter.

11. A method according to claim 10, wherein said at least one access point node parameter comprises an access point node, a username and a password.

12. A method according to claim 11, wherein said tunnel parameter information is signaled to said wireless access network in an authentication, authorization and accounting access accept message.

13. A method according to claim 12, wherein a utilized authentication, authorization and accounting protocol is RADIUS.

14. A method according to claim 12, wherein a utilized authentication, authorization and accounting protocol is Diameter.

15. A method according to claim 14, wherein said tunnel parameter information comprises at least one of a tunnel type, a tunnel medium, a tunnel server address and a tunnel assignment identification.

16. A method according to claim 15, wherein said selected user data processing node is a wireless local area network gateway.

17. A method according to claim 15, wherein said selected user data processing node is a gateway generic packet radio service support node.

18. A method according to claim 17, wherein said selection information is resolved to an authentication, authorization and accounting realm name.

19. A method according to claim 18, wherein said selection information is a service selection information.

20. A method according to claim 19, further comprising the step of storing at said selected user data processing node at least one of an external server realm name, tunnel parameters and filtering parameters.

21. A method according to claim 20, further comprising checking whether to signal said selection information to an external server based on said selection information.

22. A method according to claim 1, wherein the backbone network is a wireless local area network.

23. A method according to claim 1, wherein the backbone network is a general packet radio service network.

24. An apparatus comprising:
a processor; and
a memory,
wherein the processor, in conjunction with the memory, configured to:
select a user data processing node in a backbone network based on a selection information received in an authentication signaling from a terminal device connected to a wireless access network, said authentication signaling being used for authenticating a request for access to the backbone network that provides context-based services via said wireless access network between said terminal device and said backbone network;
obtain a tunnel parameter information from said selected user data processing node; and
signal said tunnel parameter information to an access server device in said wireless access network for creating a tunnel connection between said wireless access network and said selected user data processing node based on said tunnel parameter information.

25. An apparatus according to claim 24, wherein said authentication signaling is based on an extensible authentication protocol.

26. An apparatus according to claim 25, wherein said apparatus is a standalone wireless local area network authentication server.

27. An apparatus according to claim 25, wherein said apparatus is a gateway generic packet radio service support node.

28. An apparatus according to claim 27, wherein said service selection information comprises at least one access point node parameter.

29. An apparatus according to claim 28, wherein said authentication server is arranged to signal said tunnel parameter information in an authentication, authorization and accounting access accept message.

30. An apparatus according claim 29, wherein said tunnel parameter information comprises at least one of a tunnel type, a tunnel medium, a tunnel server address and a tunnel assignment identification.

31. An apparatus according to claim 30, wherein said tunnel type is generic routing encapsulation.

32. A device according to claim 31, wherein said tunnel medium is IPv4 or IPv6.

33. An apparatus according to claim 29, wherein said apparatus is arranged to incorporate an extensible authentication protocol success message into said authentication, authorization and accounting access accept message.

34. A device according to claim 30, wherein said tunnel type is generic routing encapsulation or said tunnel medium is IPv4 or IPv6.

35. An apparatus comprising:
a processor; and
a memory,
wherein the processor, in conjunction with the memory, configured to:
obtain an acceptance for an access request to a backbone network, the access request received from a terminal device via a wireless access network between the terminal device and the backbone network, and tunnel parameter information in a message received from an authentication server in the backbone network; and
create a tunnel connection between the wireless access network and a user data processing node in the backbone network based on said tunnel parameter information so as to provide access to the backbone network for the terminal device via the wireless access network.

36. An apparatus according to claim 35, wherein said received message is an authentication, authorization and accounting access accept message.

37. An apparatus according to claim 36, wherein said tunnel parameter information comprises at least one of a tunnel type, a tunnel medium, a tunnel server address and a tunnel assignment identification.

38. An apparatus according to claim 37, wherein said apparatus is configured to use said tunnel assignment identification as a flow identification of said created tunnel connection.

39. An apparatus according to claim 38, wherein said flow identification is signaled in a key generic routing encapsulation attribute.

40. A system, comprising:
an access controlling device of a wireless access network configured to establish a connection for context-based services via the wireless access network between at least one user terminal and at least one backbone network,
wherein said at least one backbone network comprises an authentication server device configured to provide an authentication mechanism and at least one user data processing node,
wherein the access controlling device is configured to obtain tunnel parameter information in a message received from the authentication server device and to create a tunnel connection between said wireless access network and a selected user data processing node based on said tunnel parameter information so as to provide a service access for the at least one user terminal to the backbone network via the wireless access network, the at least one user terminal being in communication with the wireless access network.

41. A device comprising:
means for selecting a user data processing node in a backbone network based on a selection information received in an authentication signaling from a terminal device connected to a wireless access network, said authentication signaling being used for authenticating a request for access to the backbone network that provides context-based services via said wireless access network between said terminal device and said backbone network, and wherein the authenticating is performed by a user terminal authentication and authorization means;

means for obtaining a tunnel parameter information from said selected user data processing node; and means for signaling said tunnel parameter information to an access server device in said wireless access network for creating a tunnel connection between said wireless access network and said selected user data processing node based on said tunnel parameter information.

42. A device according to claim 41, wherein said authentication signaling is based on an extensible authentication protocol.

43. A device according to claim 42, wherein said device is a standalone wireless local area network authentication server.

44. A device according to claim 42, wherein said selection information comprises at least one access point node parameter.

45. A device according to claim 42, wherein said device comprises means for signaling said tunnel parameter information in an authentication, authorization and accounting access accept message.

46. A device according to claim 45, wherein said device comprises means for incorporating an extensible authentication protocol success message into said authentication, authorization and accounting access accept message.

47. A device according to claim 42, wherein said tunnel parameter information comprises at least one of a tunnel type, a tunnel medium, a tunnel server address and a tunnel assignment identification.

48. A device according to claim 47, wherein said tunnel type is generic routing encapsulation, and said tunnel medium is at least one of IPv4 and IPv6.

49. A device according to claim 41, wherein said device is a gateway generic packet radio service support node.

50. A device comprising:

means for obtaining an acceptance for an access request to a backbone network, the access request received from a terminal device via a wireless access network between the terminal device and the backbone network, and tunnel parameter information in a message received from an authentication server in the backbone network; and means for creating a tunnel connection between the wireless access network and a user data processing node in the backbone network based on said tunnel parameter information so as to provide access to the backbone network for the terminal device via the wireless access network.

51. A device according to claim 50, wherein said received is an authentication, authorization and accounting access accept message.

52. A device according to claim 51, wherein said tunnel parameter information comprises at least one of a tunnel type, a tunnel medium, a tunnel server address and a tunnel assignment identification.

53. A device according to claim 52, wherein said device comprises means for using said tunnel assignment identification as a flow identification of said created tunnel connection.

54. A device according to claim 53, wherein said flow identification is signaled in key generic routing encapsulation attribute.

* * * * *